United States Patent [19]

Gallup

[11] Patent Number: 5,531,902
[45] Date of Patent: Jul. 2, 1996

[54] METHOD FOR WATER REMEDIATION

[75] Inventor: Darrell L. Gallup, Chino Hills, Calif.

[73] Assignee: Union Oil Company of California, El Segundo, Calif.

[21] Appl. No.: 273,602

[22] Filed: Jul. 12, 1994

Related U.S. Application Data

[63] Continuation of Ser. No. 996,310, Dec. 23, 1992, abandoned.

[51] Int. Cl.$^6$ ....................................... C02F 1/28
[52] U.S. Cl. .................. 210/673; 210/674; 210/676; 210/692; 210/694
[58] Field of Search ................................. 210/673, 674, 210/675, 676, 691, 692, 693, 694

[56] References Cited

U.S. PATENT DOCUMENTS

| | | | |
|---|---|---|---|
| 3,520,806 | 7/1970 | Haigh | 210/692 |
| 3,965,036 | 6/1976 | Himmelstein | 210/674 |
| 4,036,750 | 7/1977 | Jaros et al. | 210/27 |
| 4,061,724 | 12/1977 | Grose et al. | 423/335 |
| 4,105,549 | 8/1978 | Kakumoto et al. | 210/675 |
| 4,137,162 | 1/1979 | Mohri et al. | 210/40 |
| 4,186,085 | 1/1980 | Savage | 210/673 |
| 4,267,055 | 5/1981 | Neely | 210/670 |
| 4,517,094 | 5/1985 | Beall | 210/694 |
| 5,126,050 | 6/1992 | Irvine et al. | 210/694 |
| 5,158,681 | 10/1992 | Freeman et al. | 210/641 |

FOREIGN PATENT DOCUMENTS

| | | |
|---|---|---|
| 0570847 | 5/1993 | European Pat. Off. . |
| 2251525 | 6/1975 | France . |
| 2740768 | 3/1978 | Germany . |
| 3321605 | 12/1984 | Germany . |

OTHER PUBLICATIONS

Peter Cornell, "Abtrennung und Rückgewinnung van Stoffen durch Adsorption und Ionenaustausch," Chem. Ing. Tech. vol. 63, No. 10, Oct. 1991, pp. 969–976.
PCT International Search Report, PCT/US93/12313.
"Water Demineralization Benefits from Continuous Ion Exchange Process," by J. Newman, Chemical Engineering, Dec. 18, 1967, pp. 72–74.
"Saving Capital and Chemicals with Countercurrent Ion Exchange," by M. E. Gilwood, Chemical Engineering, Dec. 18, 1967, pp. 83–88.

Primary Examiner—Ivars Cintins
Attorney, Agent, or Firm—Gregory F. Wirzbicki; Alan H. Thompson

[57] ABSTRACT

BTEX and other hydracarbons are removed from oil field and refinery waste streams by countercurrent extraction techniques. The contaminated waste water is contacted with adsorbent particles, selected to adsorb BTEX and other hydrocarbons, circulating in counter current fashion to the waste water stream.

30 Claims, 1 Drawing Sheet

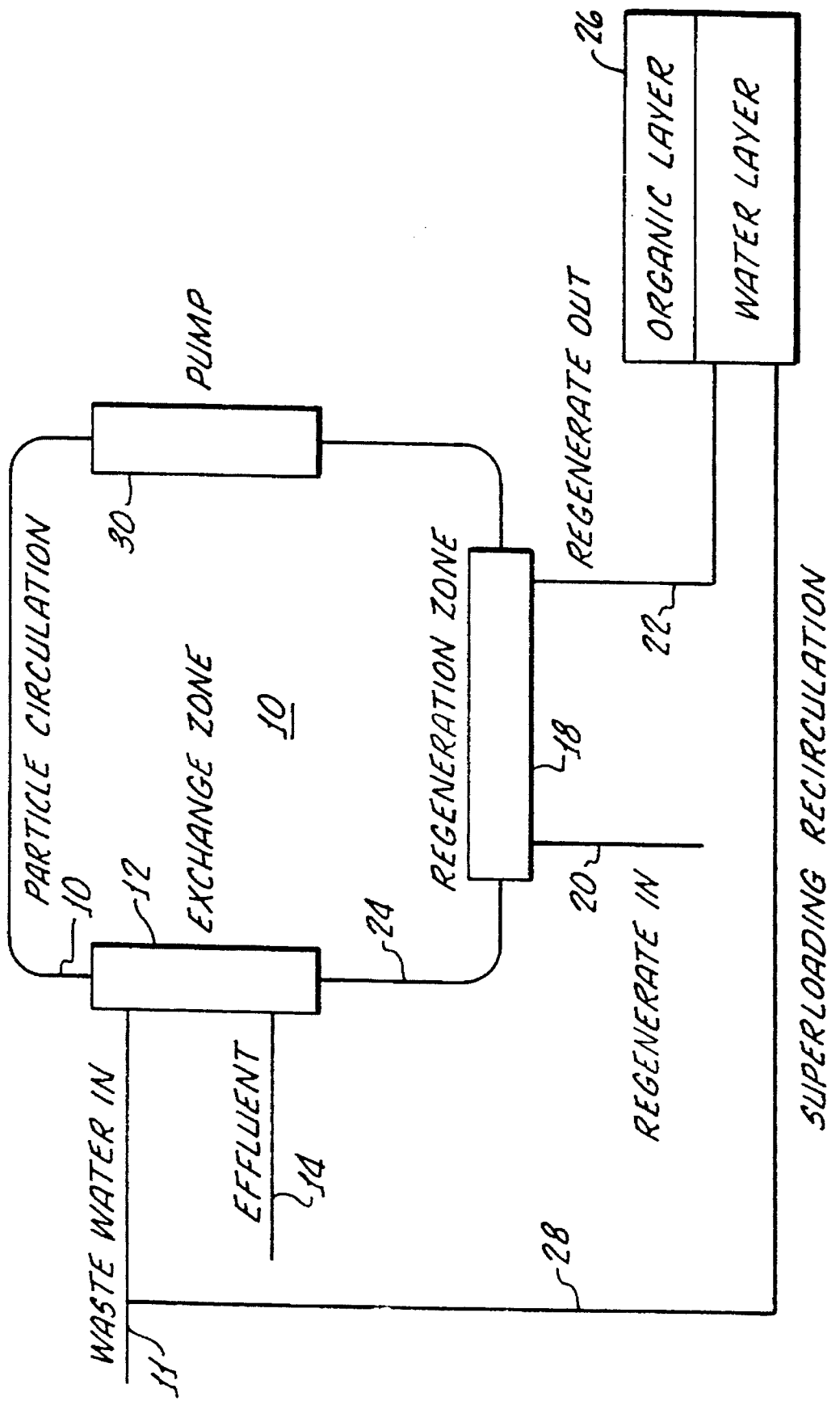

METHOD FOR WATER REMEDIATION

This application is a continuation, of application Ser. No. 07/996,310, filed Dec. 23, 1992, now abandoned.

BACKGROUND OF THE INVENTION

1. Field of the Invention

This invention relates to methods of removing unwanted impurities from water. In particular this invention relates to methods of removing unwanted hydrocarbons, especially low molecular weight monocyclic aromatic hydrocarbons, from water.

2. State of the Art

Oilfield-produced waters, remediation site waters, and refinery runoff streams all contain high concentrations of hydrocarbons. These petroleum processing derived waste waters contain particularly high concentrations of several classes of organic compounds due to the high water solubility of these classes of compounds. The low molecular weight monocyclic aromatic hydrocarbons, and some other structurally related non-hydrocarbon monocyclic aromatic compounds, for example, benzene, toluene, ethylbenzene, and the three isomers of xylene, styrene, and pyridine (a mixture of at least three of the above named components will hereinafter referred to as BTEX), comprise one such class of relatively highly water soluble hydrocarbons. However, other less soluble hydrocarbons, such as aliphatic hydrocarbons found in diesel and jet fuels and in gasoline, also pollute water and must be removed. Because of health concerns, regulators reduced the maximum acceptable concentration of BTEX in water to below 5 ppmw. Consequently, producers of BTEX contaminated water need to remove or greatly reduce the concentrations of all these polluting hydrocarbons in produced aqueous runoff streams.

Several technologies allow treatment of water to reduce the concentrations of BTEX and other hydrocarbons. These technologies include UV/ozone oxidation, UV/peroxide oxidation, high intensity UV destruction, powdered activated carbon adsorption coupled with biological treatment, granular activated carbon adsorption, air/gas stripping followed by carbon adsorption, various membrane processes, and supercritical water oxidation. While all of these technologies work acceptably well, they all require a fairly large physical plant to treat water produced on an industrial scale. For that reason, space-critical producers, for example, off shore oil platforms and the like, require different techniques to process the water they produce. A need exists for an effective water remediation method easily usable in space-critical areas.

Countercurrent technology presents a candidate for a small, space-critical water remediation unit since countercurrent installations typically have a small "footprint", that is, they are installations that require little plant area. Conventionally, countercurrent units soften and deionize water. In these conventional units, a countercurrent ion exchange resin removes inorganic components, for example, cations such as magnesium, iron or calcium, or inorganic anions. However, no countercurrent adsorption method has been designed to remove organic components, such as BTEX, diesel and gasoline components.

It would be advantageous to have a small footprint countercurrent unit that removes BTEX and other hydrocarbons from water to a maximum concentration of less than 5 ppmw. The inventor has found that countercurrent technology can provide a unit that removes at least 75% of the total BTEX from a waste water stream. The unit also provides a means to remove other, non-aromatic hydrocarbons from a waste water stream.

SUMMARY OF THE INVENTION

BTEX and other unwanted hydrocarbon components of diesel fuel and gasoline are removed from oil field and refinery waste streams by countercurrent adsorption techniques. The contaminated waste water is contacted with adsorbent particles, selected to adsorb BTEX and other hydrocarbons, that circulate counter current to the flow of the waste water stream.

A first aspect of the invention is a method for removing BTEX from produced waste water streams. The waste water stream containing BTEX is contacted with and flows through a moving bed of adsorbent particles. The adsorbent particles form a bed moving counter current to the waste water flow and interact with BTEX to preferentially remove at least 75% of the total BTEX from the waste water stream.

A second aspect of the invention is a method for removing a mixture of dissolved hydrocarbons that includes BTEX from waste water streams. The waste water stream containing the mixture of hydrocarbons contacts adsorbent particles that adsorb hydrocarbon compounds to remove at least 75% of the total hydrocarbons from the waste water stream.

Another aspect of the invention is a method of regenerating adsorbent particles used as adsorbents in a system having a waste water stream flowing with a plurality of particulate adsorbent particles moving counter current to the flow of the waste water. The particles are selected to interact with BTEX to selectively remove them from the aqueous stream. The particles move through a regeneration zone which contains a regenerant which contacts the particles and flows over the particles contacting the particles counter current to the direction of particle flow. The regenerant is selected from the group consisting of organic solvents and steam.

BRIEF DESCRIPTION OF THE DRAWING

The drawing shows a schematic flow diagram for one system that can benefit from using this invention.

DETAILED DESCRIPTION OF THE INVENTION

Two challenges face the designer of a countercurrent water remediation unit. First, a useful candidate adsorbent must extract all the unwanted components from an aqueous waste stream. Second, the unit must regenerate the candidate adsorbent. Any conventional countercurrent unit can be adapted for use in removing organic components from waste water streams. Manufacturers currently market several "countercurrent" loops. The Figure shows the details of one, but any of the others could be substituted. The critical details of the invention are a) that the adsorbent remove a substantial amount, preferably at least 75%, of the contaminating hydrocarbon from the waste water stream, b) that the method of regeneration remove substantially all the contaminants from the adsorbent particles, and c) that the particles to circulate through the system rather than occupy a stationary bed. A brief analysis of one countercurrent system will illustrate how the system works to remove organic components from water.

The phrase "preferentially remove at least 75% of the total BTEX from the waste water stream," as used herein, means that the adsorbent system must remove at least 75% of all BTEX from the waste water stream. If other hydrocarbons are present, however much of the other hydrocarbons are removed, at least the 75% of BTEX present will be removed. BTEX is by its definition a mixture, and the three or more components that comprise any BTEX will form a composition ratio. After the waste water has passed through he moving bed of this invention, the amount of reduction in concentration of each of the components will form a reduction ratio. In this invention BTEX will not be substantially partitioned by the particles, that is, the reduction ratio of the component reduced the least to the component reduced the most will not change by more than 50% from its relative amount in the composition ratio. It is preferred that the ratio not change by more than 25%. For example, if a particular BTEX mixture contains benzene, toluene, paraxylene and metaxylene in a 1:1:1:1 ratio (in dimensionless concentration), the freshened water can contain those same components in a reduced concentration in a ratio of 0.5: 0.5: 0.5: 0.25, but not, for example, 0.5: 0.5: 0.5: 0.1. The 75% reduction in BTEX will not come about because all of several components have been removed, leaving only one behind that originally was only 25% of the original composition.

Referring to FIG. 1, the waste water feed containing BTEX enters a countercurrent loop 10 in the waste water introduction line 11. The waste water fills the exchange zone 12, and moves downwardly through it (as shown in the drawing). The moving bed of adsorbent particles is stationary while the unwanted organic components are adsorbed by the particles. The freshened waste water effluent leaves the zone through the waste water effluent line 14. At predetermined intervals, the some portion of the contaminated particles leave the exchange zone through the particle removal line 16. The contaminant laden adsorbent particles circulate through the counter current loop 10 in a direction counter current to the direction taken by the waste water stream. The contaminant laden particles are then pumped through a regeneration zone 18.

The regeneration zone 18 of the loop, the lower portion of the counter current loop as shown, regenerates the circulating contaminant laden adsorbent particles by removing the adsorbed organic material. In the regeneration zone the contaminant laden adsorbent particles contact a second fluid to remove the adsorbed BTEX. Organic solvents such as water miscible acetone or water immiscible light hydrocarbon, for example hexane, or an inorganic regeneration media, such as steam, circulate counter current to the adsorbent particles. The regeneration solvent, i.e., regenerant, enters the counter current loop through the regenerant line 20 and flows past the particles contacting them in countercurrent fashion before exiting through the regeneration solvent effluent line 22. The regenerated adsorbent particles leave the regeneration zone via the regenerated particle line 24. It is preferred that the length of the line 24 be as short as possible before the particles are reintroduced into the exchange zone 12. The adsorbent particles move through the entire loop, adsorbing BTEX at the exchange zone, and being regenerated at the regeneration zone.

The regenerant leaving the regeneration zone through line 22 goes to the organic holding tank 26. Although the amount of organics typically removed from the contaminant laden adsorbent particles is small, a two phase system will eventually form in the organic holding tank as the solubility of organics in water is exceeded. The organic layer can be removed for processing into refined products or other proper disposal. It is preferred that a positive disposal technique for utilizing the organic layer be used, that is, the organic layer not merely be disposed of. The contaminated aqueous solution formed in the holding tank can be recycled back, through the super-loading recirculation line 28, to the waste water feed to "super-load" the waste water feed with excess BTEX and other hydrocarbons. A small amount of contaminated water having nearly a saturation concentration of BTEX will always be left behind for disposal. However, the volume of concentrated contaminated water will be much less than the volume of less concentrated contaminated water that traversed through the exchange zone.

The adsorbent particles are propelled through the loop, out of the exchange zone and on to the regeneration zone, by the adsorbent particle pumping means 30. The adsorbent particle pumping means moves particles around the counter current loop from the exchange zone to the regeneration loop. The pumping means comprises not only the mechanical pump but the vanes and associated hardware required to maintain the flow of the particles. Conventional disclosures such as J. Newman, "Water Demineralization Benefits from Continuous Ion Exchange Process," *Chemical Engineering*, Dec. 18, 1967, pages 72–74, and M. E. Gilwood, "Saving Capital and Chemicals with Countercurrent Ion Exchange," *Chemical Engineering*, Dec. 18, 1967, pages 83–88, both references hereby incorporated in full by reference, disclose the details of the pumping mechanism of several different kinds of countercurrent systems. A full discussion of the details of these conventional mechanisms is beyond the scope of this disclosure. Among the different countercurrent schemes discussed in these articles are the Degremont-Cottrell continuous ion-regeneration process, the Asahi process, the Chemical Separations process, and the Permutit CCIX system. These systems, and variations of these systems, can all be used in the invention. For example, the flow rate of the waste water stream through the exchange zone is at least 12 gallons per minute per square foot. However, any pumping mechanism that moves fluidized particles, as opposed to system where the waste water flows over a stationary bed of particles, is intended to be encompassed by the scope of the claims.

It should be realized that, although the particles are conventionally referred to as having "counter current" flow compared to the waste stream, in the systems identified above, the particles are generally stationary while the waste water flows through the particle bed to contact the particles. Then at preset intervals, the waste water flow momentarily stops while the pump moves a portion of the particles around the counter current loop in a direction opposite (counter current) to the direction of waste water flow. The particles therefore form what is defined herein as a "moving bed." Although the amount of particles removed from the contact zone is an inherent feature of the system used, and not critical for the operation of the invention, usually from 10 to 50% of the particles in the contact zone are removed and replaced by fresh particles. The advantage to this flow scheme is that the least processed waste water contacts the particles having the greatest loading of BTEX and other hydrocarbons, and the cleanest waste water contacts the freshest particles.

Both the adsorbent selectivity and the adsorbent particle size must be correct for the system to remove unwanted organic material from a waste water feedstock. Organic resins that adsorb organic components or inorganic adsorbents that adsorb organic components comprise the family of candidate adsorbent particles having the correct adsorbent selectivity. Examples of organic adsorbents are polymeric resins, carbonaceous resins (essentially cooked ion exchange resins), activated charcoal, and examples of inorganic adsorbents are hydrophobic silicas and zeolites. The adsorbent particles preferably easily transit through the loop. Easy transit is assured by proper particle size; preferably the particles are between about 4 and 150 mesh sized particles, and more preferably between 6 and 120 mesh. This selected dimension prevents particle packing in the counter current loop insuring that the particles will be pumped throughout the loop. The particles can be made of any suitable material to adsorb the particular combination of BTEX known to be in the water, but it is essential that the adsorbent particles not partition the BTEX, that is be preferential for adsorbing one component of BTEX while not adsorbing another. Furthermore, the adsorbent must adsorb at least 75% of the BTEX (and other hydrocarbons if present) from the waste aqueous stream.

In the counter current loop concept, organic pollutants load on the adsorbent while the adsorbent particles are simultaneously stripped and regenerated. The adsorbent materials must be sufficiently hydrophobic to adsorb organic molecules preferentially over water. Steam, inexpensive organic solvents or even salt solutions strip the organic molecules from the adsorbents. However, the strip solutions must be compatible with loop operation. Furthermore, it is greatly preferred that the strip solution not adversely affect the easy disposal of the organic layer by injection into oil fields, solvent refinery operations, or similar positive disposal techniques. Table 1 lists the adsorbents chosen for comparative study in the examples that follow and include activated carbons, molecular sieves, chromatographic-type adsorbents, carbonaceous beads and polymeric beads. The Examples show that the carbonaceous beads, polymeric beads and granulated carbon seem to be more efficient at removing the undesirable components from waste water streams.

TABLE 1

| Name | Description |
| --- | --- |
| Darco 12-20 ® | Darco GAC[1] 12-20 mesh |
| Darco 100-325 ® | Darco PAC[2] 100-325 mesh |
| Alpha 6-8 | Alpha GAC[1] 6-8 mesh pellet form |
| Ambersorb 563 ® | Rohm & Hass hydrophobic carbonaceous resin |
| Ambersorb 572 ® | Rohm & Haas mildly hydrophobic carbonaceous resin |
| Amberlite XAD 4 ™ | Rohm & Haas polymeric resin low pore size |
| Amberlite XAD 16 ™ | Rohm & Haas polymeric resin higher pore size |
| C4092 ZSM-5 Zeolite | Porous hydrocracking catalyst −20 mesh |
| ZSM-5 CA-1472B | Conteka zeolite powder |
| Silicalite C-2296 | Union Carbide molecular sieve |
| Amorphous silica | Baker silicic acid hydrate |
| Florisil | Baker mag-silicate chromatographic grade powder 60-100 mesh |
| Filter Cake | Unocal geothermal iron silicate flour |

[1]GAC means Granulated Activated Carbon
[2]PAC means Powdered Activated Carbon

EXAMPLES

The following examples further describe the invention. These examples illustrate various aspects of the invention, and should not be considered to limit the scope of the appended claims.

Example 1

In this example various adsorbents were tested for their ability to remove aromatics from Coalinga Nose Unit (CNU) produced water having a concentration of BTEX in the range of 20–30 ppm. Eight different adsorbents were examined for removal of BTEX and total organic carbon (TOC) by passing samples of CNU produced water through packed columns of samples of adsorbent. The eluent was tested for the presence of aromatics by ultra-violet (UV) absorption, and standard EPA methods 418.1 and 8020.

CNU produced water passed through two-inch diameter columns each containing 100 g of one of the adsorbents tested. The CNU water passed through at a rate of 3 gpm/ft$^2$. The effective bed contact time was about one minute. The relative efficiencies at removing BTEX are shown in Table 2.

TABLE 2

| adsorbent | B&T Loading mg | Breakthrough @ 5 ppm, BV | B&T regeneration, mg | Regeneration efficiency, % |
| --- | --- | --- | --- | --- |
| Darco GAC | 3138 | 200 | 3660 | 116 |
| Alpha AC | 3629 | 3 | 4940 | 136 |
| Ambersorb 536 | 5896 | 590 | 5236 | 89 |
| Ambersorb 572 | 8598 | 1160 | 9360 | 109 |
| XAD 4 | 1744 | 190 | 1390 | 80 |
| XAD 16 | 1211 | 150 | 926 | 76 |
| Silicalite | 830 | 55 | 630 | 76 |
| Filter Cake | 1076 | 75 | 716 | 16 |

Ambersorb 572 and 563, both carbonized ion exchange resins, removed the most benzene and toluene of all the adsorbents tested. These resins also exhibited the best breakthrough characteristics. After treating over 600 volumes of water, only 10 ppb BTEX was observed in the eluent from the Ambersorb 572 column. Furthermore, at that time, the Ambersorb 572 had not achieved 50% loading. It was observed that Ambersorb tended to load toluene in preference to benzene.

Darco and Alpha are granulated activated carbons (GAC) and are only about half as efficient at removing BTEX as the Ambersorb resins from the CNU produced water. The XAD resins (Rohm and Haas) performed well. They were particularly efficient at removing oil and grease (aliphatic hydrocarbons) from the water.

The hydrophilic silicas, silicalite catalyst and filter cake obtained from the Salton Sea Geothermal operations performed poorly.

Example 2

In this experiment the adsorbents of the first Example were regenerated with acetone.

About 2 l of technical acetone flowed through the columns holding the adsorbents after the adsorption tests. The ratio of acetone to treated water was about 1:150. The results are shown in Table 2, columns 3 and 4. It can be seen that Ambersorb and GAC regenerated well, while the regeneration of XAD polymeric resins and silicalite was acceptable. The regeneration of the geothermal silicate was unacceptably difficult.

Example 3

This Example shows laboratory studies of the ability of different adsorbents to remove gasoline components.

Distilled water containing an average of about 94 ppm of dissolved unleaded gasoline passes through 4 ml of a respective adsorbent contained in 1 inch columns. In each experiment, the adsorbents contacted 1,000 bed volumes of gasoline-contaminated water at high flow rates ranging from 2–3 gpm/ft$^2$ (effective bed contact times of 0.4–0.6 minutes). Typical flow rates below 2 gpm/ft$^2$ used in carbon adsorption applications minimized leakage of contaminants from the adsorbent. Effluent samples were monitored "on-line" for UV adsorption and also for smell. After collection, analysis of the effluent by several different methods allowed determination of loading and chromatographic characteristics of the adsorbents.

The synthetic adsorbents, Ambersorb 572 and XAD-4 appeared to remove gasoline efficiently from water. Even after treating 1,000 bed volumes of water at abnormally high flow rates, the effluents contained only very low concentrations of gasoline components. However, a small amount of methyl tertiary butyl ether, MTBE (octane booster), in the effluent was detected. Thus, it is apparent from these experiments that the synthetic adsorbents chromatographically separate gasoline components—BTEX and other "true" hydrocarbons are successfully adsorbed on the materials, while MTBE continuously leaks through the columns.

Darco granular activated carbon removed gasoline less efficiently from water than the synthetic adsorbents. Various gasoline components quickly broke through the column including MTBE.

Regeneration of the resin columns with acetone produced a significant gasoline "cut". A 100:1 water to solvent concentration ratio at a flow rate of ~0.3 gpm/ft$^2$ facilitated regeneration. Steam also regenerates the synthetic adsorbents. Thermal incineration of the adsorbed gasoline allows one other method to regenerate carbon adsorbents.

Synthetic adsorbents remediated water more efficiently than GAC. For remediation of gasoline-contaminated waters using pump and treat systems, the adsorbents may be excellent alternatives to GAC application. The adsorbents exhibit higher loading capacities, can tolerate very high flow rates and can be more easily regenerated at lower energy cost than GACs. The adsorbents employed in a CCA loop arrangement will outperform fixed-bed GAC systems.

Example 4

This Example shows laboratory studies of the ability of different adsorbents to remove diesel components.

Studies similar to those reported above for gasoline were conducted with dieselcontaminated water. Mixtures of diesel in water in a concentration of about 195 ppmw flowed through laboratory columns loaded with the synthetic adsorbents and activated carbon. The Darco GAC carbon was nearly completely loaded (saturated) with diesel after 1000 bed volumes of diesel-contaminated water flowed through the column containing the adsorbent. The loading capacity for the carbon approached 340 mg contaminant/g carbon. After 400 bed volumes of diesel contaminated water flowed through the column at high flow rate, breakthrough of diesel through the carbon column was excessive.

By contrast, even after 500 bed volumes at a very high flow rate, the synthetic adsorbents were not saturated with diesel. Although the adsorbents were not saturated, they appear to load more diesel than GAC. Ambersorb 572 "leaked" diesel early in the test, but later reduced the diesel concentration from 195 ppmw to only 5 ppmw at the end of the test. Lower flow rates of water through the column reduce leakage considerably. As in the gasoline case study described above, the synthetic adsorbents appeared to remove diesel from water more efficiently than GAC. Diesel adsorbed on the columns was completely stripped employing acetone. Steam regenerates the synthetic adsorbents.

Example 5

This example shows field and laboratory adsorption studies of real contaminated waters.

Applicant tested the adsorbents for complete loading and breakthrough employing an "on-line" field test kit at CNU. The field tests produced results similar to those conducted earlier in that Ambersorb 572 exhibited the highest loading capacity of the eight different materials tested. Steam regenerated the adsorbents in the laboratory.

In small laboratory columns, Darco GAC, Ambersorb 572 and XAD-4 removed organic contaminants from hydrocarbon-contaminated groundwater obtained from the Union Oil Company of California Carson Refinery. Each adsorbent was compared to the others. The three adsorbents remove BTEX from the water similarly. Oddly, in this test, the GAC apparently remove other, as yet unidentified, organics more efficiently than the synthetic adsorbents.

The resins were then regenerated as above using acetone.

It can be seen that countercurrent exchange technology, in conjunction with the correct adsorbent particles and regenerant, offers convenient method that uses only a small amount of plant area to remove unwanted organic contaminants from waste water streams.

Although this invention has been primarily described in conjunction with examples and by references to embodiments thereof, it is evident that the foregoing description will suggest many alternatives, modifications, and variations to those skilled in the art. Accordingly, the spirit and scope of the appended claims are intended to embrace within the invention all such alternatives, modifications, and variations.

What is claimed is:

1. A method for removing dissolved contaminant hydrocarbons from a waste water stream, the method comprising:

contacting the waste water stream containing a mixture of at least three dissolved contaminant hydrocarbons selected from the group consisting of benzene, toluene, ethyl benzene, xylene and styrene, with a bed of adsorbent particles comprising a carbonaceous resin in an exchange zone consisting essentially of (1) waste water containing the dissolved contaminant hydrocarbons and (2) the adsorbent particles, to preferentially remove at least 75% of the total dissolved contaminant hydrocarbons from the waste water stream without changing the relative proportions of the components comprising the dissolved contaminant hydrocarbons by more than 50%, and wherein the bed being stationary while the waste water flows through the bed and after the waste water flow is momentarily stopped the bed being moved in a direction opposite to that of the waste water flow.

2. The method of claim 1 wherein the waste water contains at least 20 ppmw of the dissolved contaminant hydrocarbons before contacting the adsorbent particles and less than 5 ppmw of the dissolved contaminant hydrocarbons after contact with the particles.

3. The method of claim 1 wherein the adsorbent particles move substantially around a loop, progressing from the exchange zone where the adsorbent particles adsorb the dissolved contaminant hydrocarbon components, to a regeneration zone where the adsorbed components are removed from the adsorbent particles, and returned to the exchange zone again.

4. The method of claim 1 wherein the particles are between about 4 and 150 mesh size.

5. The method of claim 1 wherein the particles are regenerated in a regeneration zone by contact with steam.

6. The method of claim 1 wherein the particles are regenerated in a regeneration zone by contact with an organic solvent.

7. The method of claim 1 wherein the waste water passes through the exchange zone at a flow rate of at least 12 gallons per minute per square foot.

8. A method for removing dissolved contaminant hydrocarbons from waste water streams, said method comprising contacting a waste water stream containing dissolved hydrocarbons comprising a mixture of at least three dissolved contaminant hydrocarbons selected from the group consisting of benzene, toluene, ethyl benzene, xylene and styrene, in an exchange zone with a bed of adsorbent particles comprising carbonaceous resin to remove at least 75% of the dissolved contaminant hydrocarbons from the waste stream, and wherein the bed being stationary while the waste flows through the bed and after the waste water flow is momentarily stopped the bed being moved in a direction opposite to that of the waste water flow.

9. The method of claim 8 wherein the dissolved hydrocarbons include at least 25 wt % of the dissolved contaminant hydrocarbons, and at least 75% of the dissolved contaminant hydrocarbons is removed from the waste water stream.

10. The method of claim 8 wherein the waste water contains at least 20 ppmw of the dissolved contaminant hydrocarbons before contacting the adsorbent particles and less than 5 ppmw of the dissolved contaminant hydrocarbons after contact with the particles.

11. The method of claim 8 wherein the method further comprises reducing the concentration of all hydrocarbon components to less than 5 ppmw.

12. The method of claim 8 wherein the particles are regenerated in a regeneration zone by contacting them with steam.

13. The method of claim 8 wherein the particles are regenerated in a regeneration zone by contacting them with an organic solvent.

14. The method of claim 8 wherein the particles move substantially around a loop, progressing from the exchange zone where the particles adsorb the dissolved contaminant hydrocarbons to a regeneration zone where the adsorbed hydrocarbons are removed from the particles and recycled to the exchange zone.

15. The method of claim 8 wherein the particles are between about 4 and 150 mesh size and the waste water stream passes through the exchange zone at a flow rate of at least 12 gallons per minute per square foot.

16. A method for removing a mixture of dissolved contaminant hydrocarbons from a waste water stream, said method comprising:

contacting the waste water stream containing a mixture of at least three dissolved contaminant hydrocarbons selected from the group consisting of benzene, toluene, ethyl benzene, xylene and styrene, with a bed of adsorbent particles comprising carbonaceous resins in an exchange zone to adsorb the dissolved contaminant hydrocarbons, the bed being stationary while the waste water flows through the bed and after the waste water flow is momentarily stopped said bed being moved in a direction opposite to that of the waste water flow, and the waste water passing through the exchange zone at a flow rate of at least 12 gallons per minute per square foot to remove at least 75% of the dissolved contaminant hydrocarbons from the waste water stream.

17. The method of claim 16 wherein the waste water contains at least 20 ppmw of the dissolved contaminant hydrocarbons before contacting the adsorbent particles and less than 5 ppmw of the dissolved contaminant hydrocarbons after contact with the particles.

18. The method of claim 16 wherein the adsorbent particles move substantially around a loop, progressing from the exchange zone where the adsorbent particles adsorb the dissolved contaminant hydrocarbon components, to a regeneration zone where the adsorbed components are removed from the adsorbent particles, and returned to the exchange zone again.

19. The method of claim 16 wherein the adsorbent particles are regenerated in a regeneration zone by contact with steam or an organic solvent.

20. The method of claim 19 wherein said organic solvent comprises acetone.

21. The method of claim 16 wherein the adsorbent particles are regenerated with steam.

22. A method for removing dissolved contaminant hydrocarbons from waste water streams, said method comprising:

contacting a waste water stream containing dissolved hydrocarbons comprising a mixture of at least three dissolved contaminant hydrocarbons selected from the group consisting of benzene, toluene, ethyl benzene, xylene, and styrene with a bed of adsorbent particles comprising carbonaceous resins in an exchange zone to adsorb said dissolved contaminant hydrocarbons on said adsorbent particles so as to remove said dissolved contaminant hydrocarbons from said waste water stream, said bed being stationary while said dissolved contaminant hydrocarbons are adsorbed by said adsorbent particles, and after the Waste water flow through said bed is momentarily stopped said bed being moved in a counter current direction to waste water flow and being essentially stationary for pre-determined time intervals.

23. The method of claim 22 wherein the particles move substantially around a loop, progressing from the exchange zone where the particles adsorb the dissolved contaminant hydrocarbons to a regeneration zone where the adsorbed hydrocarbons are removed from the particles and recycled to the exchange zone.

24. The method of claim 23 wherein said waste water stream passes through said exchange zone at a flow rate of at least 12 gallons per minute per square foot.

25. The method of claim 24 wherein the adsorbent particles are regenerated by contact with steam and the waste water contains at least 20 ppmw of the dissolved contaminant hydrocarbons before contacting the adsorbent particles and less than 5 ppmw of the dissolved contaminant hydrocarbons after contact with the particles.

26. The method of claim 22 wherein said dissolved hydrocarbons are selected from the group consisting of diesel fuel, gasoline, and a mixture comprising at least three monocyclic aromatic compounds.

27. The method of claim 22 wherein at least a portion of said adsorbent particles in said exchange zone contain adsorbed hydrocarbons from said waste water stream, said portion is removed from said exchange zone, and regenerated adsorbent particles from a regeneration zone are added to said exchange zone.

28. The method of claim 27 wherein said regeneration zone contains steam or organic solvent.

29. The method of claim 22 wherein said exchange zone consists essentially of said waste water stream and said adsorbent particles.

30. The method of claim 29 wherein the mesh size of said adsorbent particles is between 4 and 150.

* * * * *

UNITED STATES PATENT AND TRADEMARK OFFICE
CERTIFICATE OF CORRECTION

PATENT NO. : 5,531,902
DATED : July 2, 1996
INVENTOR(S) : Darrell L. Gallup

It is certified that error appears in the above-indentified patent and that said Letters Patent is hereby corrected as shown below:

Title page, Item [57] Abstract, line 1, delete "hydracarbons" and replace with -- hydrocarbons --.

Claim 8, Column 9, line 24, after "waste" and before "flows" insert -- water --.

Signed and Sealed this

Eighth Day of October, 1996

Attest:

BRUCE LEHMAN

Attesting Officer     Commissioner of Patents and Trademarks